United States Patent
Mößlein

(10) Patent No.: US 12,496,619 B2
(45) Date of Patent: Dec. 16, 2025

(54) SYSTEM AND METHOD FOR IDENTIFICATION AND/OR SORTING OF OBJECTS

(71) Applicant: POLYSECURE GMBH, Freiburg (DE)

(72) Inventor: Jochen Mößlein, Freiburg (DE)

(73) Assignee: POLYSECURE GMBH, Freiburg (DE)

(*) Notice: Subject to any disclaimer, the term of this patent is extended or adjusted under 35 U.S.C. 154(b) by 0 days.

(21) Appl. No.: 18/282,363

(22) PCT Filed: Mar. 22, 2022

(86) PCT No.: PCT/DE2022/100220
§ 371 (c)(1),
(2) Date: Sep. 15, 2023

(87) PCT Pub. No.: WO2022/199758
PCT Pub. Date: Sep. 29, 2022

(65) Prior Publication Data
US 2024/0157402 A1    May 16, 2024

(30) Foreign Application Priority Data
Mar. 22, 2021 (DE) .................. 10 2021 107 079.1

(51) Int. Cl.
*B07C 5/342* (2006.01)
*G06V 10/774* (2022.01)
(Continued)

(52) U.S. Cl.
CPC ............ *B07C 5/342* (2013.01); *G06V 10/774* (2022.01); *G06V 10/809* (2022.01); *G06V 20/80* (2022.01)

(58) Field of Classification Search
CPC .... B07C 5/342; G06V 10/774; G06V 10/809; G06V 20/80; G06V 2201/06; G06V 10/58;
(Continued)

(56) References Cited

U.S. PATENT DOCUMENTS 6,303,889 B1 * 10/2001 Hayduchok ............... B07C 3/00
  209/552
11,724,287 B2 * 8/2023 Pompe Van Meerdervoort ..........
  B07C 5/342
  209/3

FOREIGN PATENT DOCUMENTS

CN    110427896 A    11/2019
CN    110745407 A     2/2020
(Continued)

OTHER PUBLICATIONS

International Search Report (English and German) and Written Opinion of the ISA (German) issued in PCT/DE2022/100220, mailed Jun. 28, 2022; ISA/EP.
(Continued)

*Primary Examiner* — Jacob S. Scott
*Assistant Examiner* — Miraj T. Patel
(74) *Attorney, Agent, or Firm* — Harness, Dickey & Pierce, P.L.C.

(57) ABSTRACT

The invention relates to a method for identifying and/or sorting objects, in particular for recycling materials, comprising the steps of: Linking at least one first object type to object identity information via a reference object type property uniquely identifying the first object type; performing at least one learning phase for teaching at least one KI algorithm, the learning phase comprising analyzing at least one object having the reference object type property for an object property; establishing a correlation between the object identity information and the at least one object
(Continued)

Figure 1:
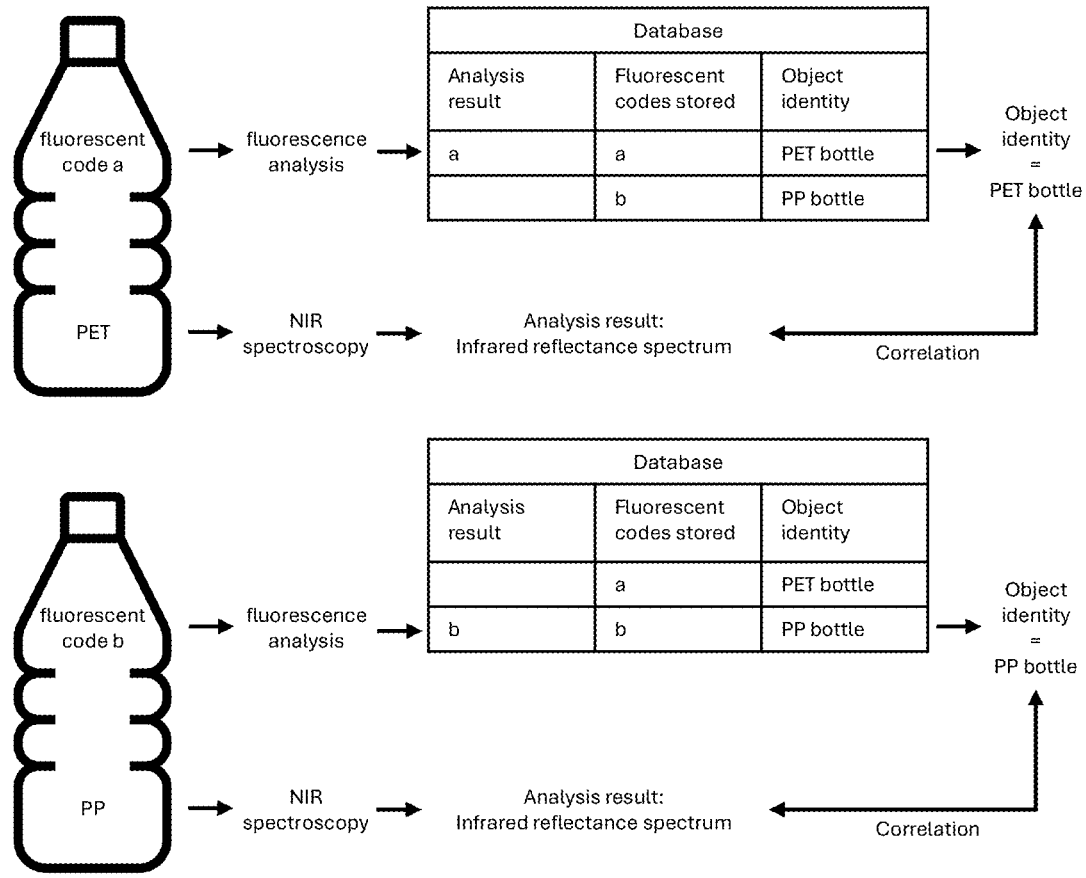

property, the correlation comprising associating the at least one analyzed object with the first object type; analyzing at least one object for at least one object property; and calculating an object identity of the object to the first object type using the at least one KI algorithm. The invention further relates to a system for identifying and/or sorting objects based on artificial intelligence technologies.

8 Claims, 2 Drawing Sheets

(51) Int. Cl.
  *G06V 10/80* (2022.01)
  *G06V 20/80* (2022.01)
(58) Field of Classification Search
  CPC .................. G06V 10/776; B29B 17/02; B29B 2017/0203; B29B 2017/0279
  See application file for complete search history.

(56) References Cited

FOREIGN PATENT DOCUMENTS

| | | |
|---|---|---|
| CN | 112188950 A | 1/2021 |
| EP | 3768484 A2 | 1/2021 |

OTHER PUBLICATIONS

Bobulski Janusz et al, "Waste Classification System Using Image Processing and Convolutional Neural Networks", May 16, 2019 (May 16, 2019), Advances in Databases and Information Systems; [Lecture Notes in Computer Science; Lect.Notes Computer], Springer International Publishing, Cham, pp. 350-361, XP047509573 ISBN: 9783319104034.

Bobulski Janusz et al, "PET waste classification method and Plastic Waste DataBase WaDaBa", Image Processing and Communications Challenges 9,vol. 681, Sep. 28, 2017 (Sep. 28, 2017), p. 57-64, XP055931870, DOI: 10.1007/978-3-319-68720-9_8 external link, ISBN: 9783319687193.

Brunner S et al, "Automated sorting of polymer flakes: Fluorescence labeling and development of a measurement system prototype", Waste Management,vol. 38, Jan. 15, 2015 (Jan. 15, 2015), p. 49-60, XP029149914 DOI: 10.1016/J.WASMAN.2014.12.006 external link, ISSN:0956-053X.

Ahmad Kashif et al, "Intelligent Fusion of Deep Features for Improved Waste Classification", IEEE Access, IEEE, USA, vol. 8, May 18, 2020 (May 18, 2020), p. 96495-96504, XP011791219, DOI: 10.1109/ACCESS.2020.2995681.

Third Party Observation filed in PCT/DE2022/100220 on Jul. 3, 2023.

* cited by examiner

| object: bottle | | |
|---|---|---|
| object properties | reference object type property | object identity |
| fluorescent code a | X | PET bottle |
| NIR spectrum being characteristic of PET | | |
| fluorescent code b | X | PP bottle |
| NIR spectrum being characteristic of PP | | |

SYSTEM AND METHOD FOR IDENTIFICATION AND/OR SORTING OF OBJECTS

CROSS-REFERENCE TO RELATED APPLICATIONS

This application is a U.S. National Phase Application under 35 U.S.C. 371 of International Application No. PCT/DE2022/100220, filed on Mar. 22, 2022, which claims the benefit of German Patent Application No. 10 2021 107 079.1, filed on Mar. 22, 2021. The entire disclosures of the above applications are incorporated herein by reference.

BACKGROUND

This section provides background information related to the present disclosure which is not necessarily prior art.

TECHNICAL FIELD

The invention relates to a method for the identification and/or sorting of objects, in particular for the recycling of materials and based on artificial intelligence technologies.

DISCUSSION

The ability to analyze many different object properties can increase the number of distinguishable specifications.

On the one hand, there is the challenge of combining and processing the large variety of analysis information collected in order to determine the identity and thus the fraction affiliation of the analyzed objects based on the totality of the available analysis information.

Another difficulty is that each of the analyzed object properties can be subject to variance. This can be production-related (e.g. due to production variations), application-related (e.g. change of object shape due to mechanical stress during collection and transport of the objects, e.g. color change due to dirt or aging) or analysis-related (e.g. different object positioning under a camera system). Object properties can also influence each other. For example, black pigments can reduce the emission intensity of luminescent materials.

The term variance is used to describe the variability of an object property within a defined set of objects. The term variance includes not only the statistical definition, but also property variations in general. The object properties can include material properties.

Therefore, an additional challenge is also the teaching of the identification system so that it can determine the identity of objects. Teaching can consist of storing reference properties in a database.

The determination of the identity of the objects can then be done by matching the captured object properties with the reference properties stored in a database.

However, the storage of reference properties for a large variety and variance of object properties is time-consuming. This is because the object properties of a representative set of objects must not only be analyzed in extensive measurement campaigns, but also evaluated and assessed in order to determine reference properties. The evaluation and assessment of the analysis results requires a high level of expertise.

Artificial Intelligence (AI) technologies can be used to solve this challenge. Artificial intelligence (AI) technology is any technology that enables the autonomous processing of a problem to be solved by means of a computer system.

In the present case, the problem to be solved by the AI technology is to derive the identity of the analyzed object from the captured analysis information. The analyzed object properties act as "input" and are processed by the AI technology. As "output", an identification result is calculated for the object or subsequently assigned to it. This calculation is performed using computational algorithms. To enable the computer system to solve this problem, the algorithms must be learned. In the learning phase, based on a set of example objects, which is a representative sample of the variety and variance of analyzable object properties, the computer system learns to generalize the acquired information and establish correlations between the acquired information and the object identity. The information acquired in the learning phase serves as training data in which patterns and regularities are recognized. As the learning phase progresses, the AI algorithms are adapted. However, the system must be given the correct identity of the objects in the learning phase. After the learning phase, the algorithms are adapted in such a way that an independent determination of the object identity by the system is possible, even if the objects in question were not used as example objects during the learning phase, provided that the properties of these objects are within an allowable variability found by the system during the learning phase. Also, the system can classify objects as non-identifiable after the learning phase if the object properties are outside this permissible variability.

The training data provided to the system in the learning phase includes a data set for each sample object consisting of the analyzed object properties and the correct object identity. This object identity represents a so-called "label".

SUMMARY

This section provides a general summary of the disclosure, and is not a comprehensive disclosure of its full scope or all of its features.

It is therefore one aspect of the present invention to provide a method and/or a system for the identification and/or sorting of objects, by means of which a more efficient and more accurate sorting is made possible.

Therefore, the present invention also relates to an intelligent system and method for identifying and/or sorting objects based on AI technologies. A system and method is provided, wherein a detection system having one or more detection modules is used to analyze object properties of the objects to be identified. The analyzed object properties are transmitted to a computer system and processed by said computer system to calculate an object identity of the objects to be identified. The objects can be sorted according to the object identity calculated and assigned to them.

The identity of an object is to be understood as belonging to a fraction. Fraction membership in the sense of the invention describes the property of an object or material to be part of an object/material fraction, where all parts of this object/material fraction have common properties. These properties may be, for example, a material type (e.g. PE), an origin (e.g. manufacturer of the material), an application (e.g. food packaging) or any other property (e.g. content of a certain additive). The parts of an object/material fraction may also have common combined properties (e.g. PE of a particular manufacturer). The system and method thus performs a classification of the objects, assigning the objects to a specific object/material fraction and thus class. The objects can be sorted according to this assignment.

In a particular embodiment, the method comprises the steps of: Linking at least a first object type and a reference object type property uniquely identifying the first object type via object identity information; Performing at least one learning phase for teaching at least one AI algorithm, the learning phase comprising analyzing at least one object having the reference object type property for the reference object type property and at least one object property different from the reference object type property; Establishing a correlation between the object identity information and the at least one object property different from the reference object type property, the correlation comprising associating the at least one analyzed object with the first object type; Analyzing at least one object for the at least one object property different from the reference object type property and calculating an object identity of the object to the first object type by means of the at least one AI algorithm if it has the at least one object property different from the reference object type property.

The analysis of object properties can be qualitative or quantitative. Qualitative analysis determines whether a property is present or not. Quantitative analysis can determine how pronounced a property is.

The object property analysis may comprise detecting a property applied to or introduced into the object, such as detecting a fluorescent code and/or an XRF (X-ray fluorescence analysis) code and/or a magnetic code and/or a particle code and/or electronic data and/or a watermark and/or a bar code and/or a QR code and/or a symbol and/or an item number and/or design elements. Alternatively, the spectroscopic analyzing may comprise detecting a native property of the object, such as a chemical material composition of the object. A color and/or a shape and/or a size and/or a surface texture of the object may also be detected.

A fluorescent code is based on incorporated or applied luminescent markers. A luminescent marker may comprise at least one luminescent material, e.g., a fluorescent material and/or a phosphorescent material and/or an upconverter and/or a downconverter and/or a material that re-emits an excitation wavelength upon excitation. A luminescent marker may emit at least one emission wavelength or a plurality of emission wavelengths upon excitation. Single different luminescent markers or mixtures of different luminescent markers may be used. Furthermore, the luminescence markers may be contained in the mixtures in different amounts, for example, so that an evaluable feature is created via the intensity distribution of the emitted wavelengths.

Luminescence is the emission of electromagnetic radiation after the input of energy. It is preferred that the energy input occurs via photons, so that the observed luminescence is photoluminescence. The photoluminescence can occur in the UV and/or VIS and/or IR. Upconverters are luminescent substances that, after excitation, emit photons whose wavelength is shorter than the wavelength of the excitation photons. Downconverters are luminescent substances which, after excitation, emit photons whose wavelength is longer than the wavelength of the excitation photons.

Analyzing a fluorescent code may comprise spectroscopic analyzing in which the luminescent marker(s) is/are electromagnetically excited to analyze the emitted spectrum. Analyzing the fluorescent code may comprise analyzing the presence and/or absence of specific and/or analyzing emission intensity for one or more emission wavelengths or wavelength ranges and/or analyzing emission intensity ratios between emission wavelengths or emission wavelength ranges and/or analyzing an entire emission spectrum, i.e., intensity of emission as a function of wavelength or frequency, and/or analyzing a dynamic emission response.

The dynamic emission behavior is understood as the luminescence emission behavior over time. For analysis purposes, the emission of the luminescence can be measured over a defined period of time after the end of the luminescence excitation. Here, a fixed dead time can be provided between the end of the excitation and the start of the first measurement. After excitation, the luminescence intensity for an emission wavelength or wavelength range can be determined several times according to specified time intervals. Intensity curves over time can be formed from the absolute intensities obtained. This can also be performed for multiple emission wavelengths or wavelength ranges. Likewise, intensity ratios can be formed from the absolute intensities obtained for identical or different emission wavelengths/wavelength ranges. It is also preferred that the decay constant be determined for one or more emission wavelengths or wavelength ranges. The decay constant is understood to be the time period in which the initial intensity of the emission drops to 1/e times.

A large number of luminescent substances exist. The luminescence properties of luminescent substances can be varied by varying their chemical composition. This results in a large number of variants, which can be further increased by combining different luminescent markers. Thus, a large number of distinguishable fluorescence codes can be generated. Suitable fluorescence codes can be selected in relation to the objects to be marked. Due to their higher energetic emission compared to excitation, upconverters offer the possibility of optical background-free detection of the marker signals. This results in the potential to achieve a particularly high signal-to-noise ratio. Downconverters can have higher quantum yields.

An XRF code is to be understood as a code which can be detected by means of X-ray fluorescence analysis (XRF). The XRF code can be formed, for example, by defined quantities of one or more chemical elements. XRF codes are suitable, for example, for objects whose optical properties make the use of photoluminescent markers difficult, e.g. for black objects.

A magnetic code can be based on magnetic particles with different magnetic properties. Magnetic Particle Spectroscopy" can be used to analyze a magnetic code. Magnetic codes are also suitable for objects whose optical properties make it difficult to use photoluminescent markers, e.g. for black objects.

A particle code may be based on randomly distributed particles. The particles may include luminescent particles. Camera systems, optionally with illumination and excitation units, may be used to detect the particle pattern. The illumination and excitation units may be designed to re-emission luminescent particles. The random distribution of the particles creates a unique particle pattern. An object that has this unique particle pattern can be uniquely identified by detecting this pattern. Particle codes are therefore suitable, for example, for objects that are to be uniquely and individually identified.

Fluorescent codes, XRF codes, magnetic codes and particle codes can be added to a printing ink. For example, the printing ink may be provided in a portion of the printing that an object has anyway. Alternatively, or additionally, the printing ink may be provided for printing on a label, shrink film, or the like of the object. Further, the printing ink may be used for direct printing on, for example, a package. Alternatively, or additionally, these codes may be provided in a label adhesive, in a varnish for a label or packaging material, in a base material of a label or shrink film, or in the base material of the object, for example in a plastic of a plastic bottle.

Electronic data can be stored on RFID transponders, for example. RFID transponders can be attached to a wide variety of objects. The data can be captured by an RFID reader.

Watermarks are codes that are inconspicuous to the human eye and are applied to the surface of objects, e.g. packaging. Watermarks are recorded using camera systems. Watermarks are suitable, for example, for objects with larger accessible surfaces.

Bar codes, QR codes, symbols, article numbers and design elements such as logos, or picture marks are common markings of products and are therefore suitable for the identification and sorting of objects. They can be detected via optical detection devices.

In addition to properties applied or introduced into the object, native properties can also be detected. The chemical material composition of an object can, for example, be analyzed using near-infrared (NIR) spectroscopy. Here, objects can be assigned to a material class based on the IR reflectance spectrum. Classical plastics such as polyethylene or polypropylene can be detected. Laser-induced plasma spectroscopy (LIPS) is a method for determining the element-specific composition of a sample. The color of objects can be determined, for example, using visual spectroscopy (VIS) or color line cameras. The electrical conductivity can be analyzed by means of electromagnetic sensors. Metals can be detected by this method. X-ray fluorescence analysis is also suitable for the detection of metals. X-ray transmission sensors can be used to analyze the atomic density of materials. This makes it possible, for example, to distinguish between aluminum and heavy metals. Other object properties, such as color, shape, size or surface structure can be detected, for example, using color line scan camera systems.

A conveyor device can be provided for feeding objects to the detection system. Likewise, a transport device may be provided for transporting the objects through the detection system. Alternatively, if the detection system is arranged substantially vertically, the objects may be transported through the system driven by gravity.

The objects can be provided in pulse form, so that they are first separated in a first step to optimize the analysis result.

For the separation of the pulse fed arrangement of objects, any device for the separation of the objects can be provided. This can be, for example, a plurality of conveyor belts connected in series with increasing conveying speed, baffles, a jogging device, a robot system, an infeed station with manual loading or the like. In this case, the separation can pursue the goal of positioning the objects with a sufficient distance from each other, which is necessary for object-specific detection, e.g. by preventing contact or overlapping of several objects, or positioning the objects arranged in series in the feed direction of a conveyor. The objects can be transported further with the aid of a distribution conveyor with segmented carrying means, but also with the aid of a distribution conveyor with continuous carrying means.

Before separation, the objects can be fed mechanically from a collection store to the sorting process. Alternatively, the objects can also be fed manually. If the individual objects are fed one after the other, the objects are separated at the same time.

A distribution conveyor with segmented carrying means is a conveyor system in which each transported object is located at a defined place, e.g. in a trough-shaped pick-up point. In distribution conveyors with continuous carrying means, the objects are not located at defined places.

The separation offers several advantages. On the one hand, only one object is examined during the analysis of the object properties. Therefore, object-specific analysis results can be obtained. Without separation, several objects with different object properties could be present in the detection module at the same time or could be present in a detection module without sufficient spatial separation, which would lead to mixed analysis results. Furthermore, the separation enables individual objects to be deposited on one segmented carrier each and thus the targeted transport of individual objects to defined target points.

After the objects have passed through the devices for separation, the presence of separated objects can be checked. This can be done, for example, by means of optical image recognition. If several objects are detected and the separation is therefore faulty, the analysis process can be paused. The group of non-separated objects then passes through the detection without analysis and can subsequently be sorted out as non-analyzable or added to the separation step again.

The detection technology required to analyze an object property is realized in a detection module.

The detection technologies used may include sensor technology for luminescence analysis, optical sensor technology, such as camera systems like hyperspectral cameras or color line scan cameras, VIS spectrometry, infrared spectrometry such as a near-infrared (NIR) spectrometry, detectors based on magnetic coils, electromagnetic sensors, RFID readers, X-ray sensor technology (e.g., XRF or X-ray transmission sensor technology), laser-induced plasma spectroscopy (LIPS), metal sensor technology, and the like.

The analysis of the fluorescent code(s) or luminescent marker(s) can be performed using known methods of spectroscopy, which in the context of this application means any method or device capable of analyzing a total emission spectrum, a partial emission spectrum, wavelength ranges, individual emission wavelengths, or a dynamic emission response.

For luminescence analysis, for example, various detectors such as black and white cameras, color cameras, hyperspectral cameras, photomultipliers, spectrometers, photocells, photodiodes, phototransistors can be used alone or in combination. Furthermore, optical filters such as long pass/short pass/band pass filters may be included.

Broadband and/or narrowband sources such as lasers, laser diodes, light-emitting diodes (LEDs), xenon lamps, halogen lamps can be used individually or in combination to excite the luminescence. The excitation sources can be activated individually or activated simultaneously or sequentially in different combinations. Optical filters such as long pass/short pass/band pass filters can be used in the excitation devices. Furthermore, variation of the aperture width of the excitation sources may be provided to modulate the size of an excitation zone through which material to be identified is transported. The excitation zone can also be modulated by arranging several excitation sources sequentially one after the other and varying the number of activated excitation sources in this arrangement.

To sort the objects according to the calculated object identity, the computer system can control a sorting device. The sorting device may include, for example, drop flap sorters, tilt switch sorters, or nozzle bars for blowing out objects.

Sorting of the separated objects may comprise addressing of a carrying means of the conveyor, to which exactly one of the separated objects is assigned, whereby the separated object is supplied to the destination address.

Addressing may involve driving at least a plurality of independently controllable carrying means of a conveyor. The conveyor can be, for example, a cross belt sorter with a plurality of interlinked and independently controllable conveyor belts or a drop flap sorter with a plurality of independently controllable drop flaps.

After the object identity has been calculated, the target address associated with the calculated object identity can be assigned to a carrier of the conveyor to which exactly one of the separated objects is assigned by comparing it with the target addresses stored in a database for various object identities.

After the matching, the target address can consequently be assigned to the analyzed object or a carrying means of a conveyor, for example a transport container of a drop flap sorter, a segment of a cross belt sorter or the like. The objects separated on the sorter can thus be positioned, for example, on a distribution conveyor with segmented carrying means, making it possible to transport the individual objects with the assigned destination address to the assigned destination address, for example, to a storage container for specific types of plastic from a specific manufacturer or to an otherwise specific addressee.

When using nozzle bars to blow out objects, nozzles can be activated depending on the calculation of the object identity and the comparison with the target addresses stored in a database for object identities. The objects are then blown out according to their assigned target address, e.g. into a collection container provided for this purpose.

To check for the presence of objects on the conveyor and/or in the detection system and/or in the sorting device, detection modules for object detection can be provided, e.g. camera systems or non-imaging detectors such as light barriers. When an object is present on the conveyor and/or in the detection system, activation of the detection system and AI algorithms may be activated. When an object is present in the sorting device, the sorting device can be activated. Further, these detection modules may be provided for detecting the presence of non-singular objects. Non-singular objects are to be understood as objects which are not positioned at a sufficient distance from each other necessary for object-specific detection, e.g. because they touch or overlap each other. When non-singular objects are detected, the detection system and/or algorithms may be disabled to prevent detection of mixed object properties. Further, the sorting device may be caused to transport non-singular objects to a separate collection bin.

The computer system includes an AI algorithm or several different AI algorithms. The algorithm(s) compute an object identity based on the analyzed object properties. The information of a detection module can be processed by an algorithm. Through this, the analysis of each detection module can be used to calculate an object identity. Furthermore, the algorithm can be optimized specifically for the analyzed object property. The information of a detection module can also be processed by multiple algorithms. Hereby, the results of different algorithms can be compared in order to select particularly suitable algorithms. By dividing the algorithms among the individual detection modules or individual detection characteristics of the same detection module, it is particularly easy to carry out updates, make further developments or correct errors on the module. However, the information from several detection modules can also be processed by a common algorithm. Integrating the functions of the detection modules into a common algorithm can be particularly advantageous if constant or regular data reconciliation is performed between the analysis data of the various detection modules. In this case, several object properties can be used from the outset to calculate an object identity.

When using multiple algorithms, the calculated individual object identities of all algorithms can be combined into a combined overall object identity and the overall object identity can then be assigned to the respective object. For this purpose, a voting algorithm may be provided which calculates the combined object identity. The calculation may include determining the most frequently received object identity as the combined object identity. Furthermore, a different weighting of individual received object identities may be performed. This allows, for example, a weaker weighting of material features that are susceptible to interference.

AI algorithms in the context of this application, shall mean all learnable networks and associated computational algorithms that can be learned via machine learning concepts and, after the learning phase, are capable of computing object identities based on analyzed object properties.

A variety of AI algorithms can be applied. For example, the algorithms VGG16, VGG19, ResNet50, ResNet 101, or ResNet152 can be used. Support Vector Machine algorithms can also be applied.

The algorithms are learned using machine learning concepts. Here, the algorithms are trained by training data. The training data are the analyzed object properties of objects. In the learning phase, a correlation is established between the acquired object properties and the object identity. The correct object identity of the objects is given to the system. Accordingly, the correct object identity is also part of the training data.

Machine learning reduces the amount of work required to teach the identification system. The system must be given the object identity of the objects. However, there is no need for people to assess and evaluate the detected object properties.

All available object properties can be included in the learning phase as training data, or a selection or even only a single object property. The selection of the used object properties can be based on the object properties which are suitable for the identification and/or sorting of the objects. If the objects have defined properties (e.g. when sorting plastic production waste of a defined production line in the production plant), then the analysis of a selection of suitable object properties may be sufficient (e.g. color or material composition), while the analysis of unsuitable object properties (e.g. metal content) can be dispensed with. If a large variety of different objects is expected, then all object properties can be included in the learning phase.

For the learning phase, objects can be used which have been produced especially for this purpose, or regular objects from industrial business operations. In the learning phase, only objects with an identical object identity can be presented. Several varieties of objects with different object identities can also be presented. This has the advantage that different object identities can be trained to the system simultaneously. Objects can also be presented together with companion objects. Accompanying objects are objects to which the object identity "unknown" is to be assigned both in the learning phase and in regular operation. In this way, the system can be taught to differentiate between objects with a defined identity and objects with an unknown identity.

In the learning phase, the system is given the object identity of the objects. This can be done by a human operator entering the corresponding object identity as part of the analysis of the object properties of an object. This process can be repeated several times until the system calculates the correct object identity with a previously defined reliability rate. The reliability rate should be understood as the quotient of the number of correctly recognized object identities and the total number of analyzed objects.

The reliability rate, which is to be achieved, can correspond to the identification quality and thus sorting quality, which is to be achieved at least in the regular operation of the method. This can be 0.8, 0.9, preferably 0.95, more preferably 0.97, even more preferably 0.99. These grades can also represent grade ranges, e.g. 0.8-1, 0.9-1, more preferably 0.95-1, even more preferably 0.97-1, or even 0.99-1 can be provided.

If objects with different identities are used, these different object identities must be entered accordingly. If additional companion objects are used, the object identity "unknown" must be entered after their analysis. Since in the learning phase the correct identity must be entered by an employee for each analyzed object, the method is associated with a high workload, especially when different objects and companion objects are used. This workload limits the number and variety of applicable objects during the learning phase. A realistic representation of all possible variances (e.g., different degrees of pollution and types of pollution) and variants (e.g., by an enormous variety of possible accompanying objects in a collection container) is therefore difficult to realize.

Therefore, to simplify the learning phase, a method is proposed in which at least one of the detected object properties acts as a "reference object type property" (e.g., luminescence emission spectrum or object shape) that uniquely correlates the analyzed objects with their object identity (e.g., HDPE bottles from a particular manufacturer). In this method, the analysis of the object properties of the objects includes checking whether the reference object type property is present in the objects. If the reference object type property is present, then the system can autonomously assign the correct object identity to the objects. The assignment of this object identity can be done by matching the captured reference object type properties with reference object type properties stored in a database, where the corresponding object identities are assigned to the reference properties in the database. In addition to the analysis of the "reference object type property", further object properties of the objects can be analyzed. Hereby the algorithms are trained by the further detected object properties (e.g., shape, color, image pattern, infrared reflectance spectrum, X-ray fluorescence spectrum, metal content). At the same time, the correlation between the object properties of the objects and the correct object identity established by the reference object type property is implemented in the algorithms.

Thus, the learning phase may include analyzing object properties, checking the presence of a reference object type property, assigning an object identity, learning AI algorithms by the analyzed object properties, and establishing a correlation between the analyzed object properties and the object identity. The learning phase can be performed with a variety of objects, largely without human intervention, until the system computes the correct object identity at a predefined reliability rate. By applying a reference object type property that can be detected by the system and the associated uniquely assignable object identity, the learning phase can be largely autonomous.

The detected "reference property" (e.g., luminescence emission spectrum) can be used by the system in two ways. On the one hand, the detected reference property can be compared with the reference properties stored in a database as described, and an object identity can be assigned to the analyzed objects via this. On the other hand, the detected reference property can be used to teach AI algorithms in the same way as the other detected object properties. After completion of the learning phase, the reference property can then also be used in the calculation of the object identity by the AI algorithms.

In the learning phase, a group of several object properties can also act as a "reference object type property" (e.g., emission spectrum and object shape) and establish the correlation between the analyzed object and the object identity.

In the learning phase, several different objects with different reference object type properties can also be used. The system then autonomously assigns the associated object identities to the different reference objects. Likewise, companion objects without reference object type properties can be applied. If it is determined that a reference object type property is missing, the system can autonomously assign the object identity "unknown" to these objects. Consequently, the system can also teach the calculation of the object identity for different objects largely autonomously.

Reference objects are objects provided to establish a correlation between the analyzed object properties and the object identity in the learning phase of AI algorithms.

The system can provide a feedback of already analyzed objects to the detection modules. This allows objects to be guided in a circle, which enables an uninterrupted learning phase. Here, mechanical devices, e.g. baffles, can be provided to change the position of the objects, allowing the system to learn an identification of even differently positioned objects. In the simplest case, a single object can be guided in a circle to generate different measurement data.

Object properties that are always present in the objects can be used as reference object type properties. This can be, for example, the regular material composition and/or shape and/or color of the objects. However, properties can also be used as reference object properties, which have been added to the objects specifically for this application, i.e. for establishing a correlation between object and object identity in the learning phase. This can be any object property, e.g., fluorescent codes in the base material of the objects, in the printing ink of objects or labels or elsewhere, or other markings such as QR codes or watermarks.

Companion objects can be assigned any other object identity by an operator during the learning phase. This enables the subsequent assignment of an identity to objects to which no defined reference object type property can be assigned, e.g., because a suitable reference object type property cannot be identified or because a targeted addition of a reference object type property is not possible for technical reasons.

After the learning phase, the system can be tested by disabling the presence check of a reference object type property and thus the autonomous assignment of the correct object identity based on the reference object type property. For this purpose the detection module provided for detecting the reference object type property can be deactivated or the comparison of the detected reference object type properties with the reference object type properties stored in a database and linked to object identities can be omitted. It can then be checked whether the system calculates the correct object identity based on the other detected object properties with the previously defined reliability rate. If the system has been trained to identify objects without a reference object type property, then testing of the system is performed by omitting the input of the correct object identity by the human operator.

After completion of the learning phase, the system can also calculate the object identity in regular operation on the basis of the other captured object properties. The reference object type property used in the learning phase then no longer needs to be present on the objects. However, the reference object type property can also be included in the calculation of the object identity in regular operation, provided that the objects have the "reference object type property" in regular operation.

In control mode, one, several or all of the detected object properties can act as "input". The selection of the analyzed object properties can be based on the object properties that were used in the learning phase.

Even with basically identical objects, the recorded object properties can differ. This can be due, for example, to manufacturing-related quality variations, unequal mechanical stress, different service lives (different aging times) or different levels of contamination. In the method described, such variances can be included in the learning phase by using a representative selection of reference objects that contain the property variations that occur. In regular operation, the system can then calculate the correct object identity even for objects with such property variations.

The reference object type properties can also be used to autonomously check the reliability of the object identification. For this purpose, on the one hand, the object identity is calculated by the algorithm(s). On the other hand, the system checks the presence of reference object type properties. The calculated object identity and the correct object identity defined via the possibly found reference property are stored in a database for each analyzed object. The calculated identities can be compared with the correct object identities. The higher the match, the higher the reliability of the calculated object identity.

The acquired object properties can also be used to determine the variance of the acquired object properties. Here, a measurement data range is calculated from the measurement data of all individual objects. The measurement data range obtained can then be used to optimally adapt the sensors of the detection modules to the expected measurement results. For example, from the analysis of luminescent marker codes, the variances of the emission intensity, emission maxima (wavelengths with maximum emission), and/or half-widths can be obtained. Based on this, the sensor system can be optimally adapted in terms of spectral sensitivity and selectivity, e.g. by adjusting the excitation intensity or selecting suitable optical filters. The adaptation of the detection modules can be done with inactive modules. This is the case, for example, if new hardware components have to be installed in the modules based on the obtained measurement data range. However, the adaptation can also be done for active modules. This can be applied if all technical components necessary for adaptation are already integrated in the module and can be controlled. Then an adaptation of the sensor technology can also be carried out during operation of the system. The influence of the adaptation on the object detection can thus also be investigated directly.

As an alternative to the analyzed object properties of real reference objects, virtual object properties can also serve as "input" in the learning phase and be processed by AI technology. These virtual object properties and thus virtual data sets can, for example, be based on measurement data of reference objects that have been obtained and stored with external measurement modules and are only subsequently made available to the device proposed here. This offers the advantage that data from detection modules not yet implemented in the device can also be incorporated. In this way, the technical feasibility and performance of such detection modules in the overall system can be investigated before they are integrated into the device. The virtual data sets can be based on the measurement of a set of reference objects, which ensures a representative selection of the variety and variance of the analyzed object property. However, the virtual data sets may also be based on a smaller number of reference objects that does not cover the full range of variances. In this case, the obtained measurement results can be artificially duplicated and varied, e.g. computer-aided, to obtain a virtual duplication of the objects and a virtual increase of the measurement data variability. This offers the advantage that also the identification of reference objects, which are not available in a sufficient number for a representative selection, can be tested.

The method can be used for the identification and/or sorting of any objects, e.g. from private households, trade or industry. It can be e.g. production waste from commercial and industrial enterprises, or used sales packaging from private households. The identification and sorting of the objects enabled an efficient recycling of the contained materials. Accordingly, for example, the identification and/or sorting of objects made of plastics enables efficient recycling of various plastic materials. However, the method can be applied to a wide variety of materials, including materials containing metals.

The presented system offers several advantages:

A wide variety of detection technologies or detection modules can be used to analyze a wide variety of object properties. The possibility of analyzing many different object properties can increase the number of specifications that can be distinguished.

Furthermore, the inclusion of diverse material information enables a more reliable determination of object identity.

The reliable determination of a large number of distinguishable specifications offers particular advantages in the application of the method for the recycling of materials, since a high-quality recycling of materials requires a high degree of varietal purity of the sorted objects and thus of the materials contained in the objects.

Both native and inserted/applied object properties can be analyzed. The analysis of native object properties allows identification and sorting based on natural object properties. By means of inserted/applied object properties, e.g. the application of fluorescence codes or watermarks, information can be added to objects. The analysis of such properties therefore enables identification and sorting independent of natural object properties based on arbitrary specifications.

The detection technologies or detection modules used in the learning phase and in regular operation can be selected depending on the properties of the objects to be identified. The identification system can contain all available detection modules. These can be activated or deactivated accordingly. Alternatively, the identification system can be specifically equipped with the detection modules to be used.

The application of AI simplifies both the inclusion of many object properties and the consideration of variance in object properties to identify an object identity, since diversity and variance in object properties can be implemented in the algorithms.

The use of AI technology reduces the amount of work required to teach the system. Teaching the AI can be done with the assistance of a human operator. By including a physically measurable reference object type property that connects to the correct object identity, the amount of work required to teach the system can be further reduced so that teaching can be largely autonomous.

Due to the largely autonomous teaching, the number of objects used in the learning phase can be increased. This ensures that the learning is performed on a representative sample representing the variance of the object properties.

If object feedback is implemented, an uninterrupted learning phase is made possible.

Objects from regular business operations can be used as objects for the learning phase. This ensures that variances in the object properties due to production and use are included in the analyses. However, objects can also be used which have been produced specifically for this purpose. This allows, for example, the use of objects with selected and known property variants. Furthermore, these objects can be selectively subjected to different test conditions (e.g. treatment with defined test substances or mechanical or climatic loads) in order to adapt the system to the property variations induced thereby. Furthermore, objects can be equipped with a "reference object type property" for the learning phase.

The use of objects that have been specially produced for the learning phase enables such objects to be tested in terms of their identifiability and sortability. This allows objects to be tested for recyclability before they are used in regular business operations. The results of this testing can be incorporated into the design-for-recycling of these objects.

In the learning phase, only objects with an identical object identity can be presented. However, when identifying and sorting objects, there is often the difficulty that the objects to be identified are mixed with other known but still different objects and a large number of unknown objects. To teach the system to this scenario, several sorts of objects with different object identities can also be presented. This has the advantage that the system can be trained with different object identities at the same time. Objects can also be presented together with companion objects. Accompanying objects are objects to which the object identity "unknown" is to be assigned both in the learning phase and in regular operation. In this way, the system can be taught to differentiate between objects with a defined identity and objects with an unknown identity under already realistic control mode conditions.

By using a "reference object type property" and the hereby achieved autonomous teaching of a correlation between analyzed object properties and object identity, the teaching and testing of the identification of new objects during operation of the identification and sorting system is facilitated. Without a reference object type property, the new object identity must be mapped by a human operator to the analysis data of the object properties of the new objects. When a large number of diverse objects pass through the detection modules of the system during operation, this is not very practical. It may then be necessary to interrupt regular operation in order to carry out the teaching and testing of new objects in a separate test campaign. In addition to the interruption of operation, this also has the disadvantage that any influences due to the presence of other objects cannot be detected.

Once the system has been successfully taught, the reference object type property can be dispensed with. This enables a cost saving if these properties do not have to be implemented in marketed products. Furthermore, this allows the use of reference object type properties that should not be used in marketed products due to technical considerations. This may apply, for example, to reference object type properties based on additives that do not have regulatory approval for the scope of the products, or that could have a negative impact on product function over a long product lifetime.

As "reference object type property" an object property can be selected which does not influence the detection result of the other detected object properties. This can avoid the calculation of an incorrect object identity in case of later absence of the "reference object type property". Some suitable reference object type properties are described below. Plastic objects can be mixed with luminescent substances by adding these substances during the production of the objects. Inorganic anti-Stokes crystals, inorganic Stokes crystals or organic luminescent substances can be used, for example. Stokes crystals exhibit a Stokes shift and are downconverters. Anti-Stokes crystals are upconverters. There are inorganic anti-Stokes crystals which can be excited with IR radiation and luminesce in the visible spectral range. These substances have no influence on the usual coloring additives used for coloring products. In other words, the inorganic Anti-Stokes crystals do not affect the color of the objects if no infrared excitation takes place. Furthermore, the crystals need only be used in very small quantities. Therefore, they do not have a significant influence on the transparency of objects. Furthermore, there is no influence on the object shape. Consequently, they are suitable e.g. as a reference object type property for teaching the system by the object properties "color", "shape" or image patterns, which can be detected by means of suitable camera systems. Therefore, by applying different anti-Stokes crystals with different emission spectra to different objects with different colors, shapes or images, the system can be taught to identify these different objects. After the learning phase, the system can identify the objects based on their color, shape, or images, even if the anti-Stokes crystals are no longer included. Conversely, for example, the object shape can serve as a reference object type property for learning the system through the emission characteristics of anti-Stokes crystals, which can be detected with suitable spectrometers, cameras, or photodiodes, for example. For example, three types of objects made of the same material but with different shapes could each be marked with characteristic anti-Stokes crystals. In this way, the system can be trained to detect objects using the object property of the anti-Stokes emission spectrum. After the learning phase, the system can identify objects based on the anti-Stokes crystals they contain, even if other object shapes are present. Likewise, there are inorganic Stokes crystals which have emission wavelengths <1100 nm. However, they have no effect on the infrared reflectance spectrum above 1100 nm. Consequently, they are suitable as a reference object type property for learning the system through the IR reflectance spectrum as the analyzed object property. Thus, objects with closely related but distinguishable IR reflectance spectra could be used in the learning phase, with one of the object types being equipped with Stokes crystals. The system is thereby trained on object detection using the IR reflectance spectrum, with the presence of a luminescence emission <1100 nm serving as the reference object type property. After the learning phase, the system can identify the object type of the objects marked with Stokes crystals based on the IR reflectance spectrum in differentiation from the other objects, even if Stokes crystals are no longer present. Furthermore, organic phosphors are known, which can be excited e.g. with UV light and show characteristic emission spectra. Such substances can also be suitable as reference object type properties, as long as these have no influence on the properties of the object properties to be trained. For example, object types with different metal content could be marked with characteristic organic luminescent substances in each case. In this way, the system can be trained to recognize objects by means of the object property "metal content". After the learning phase, the system can identify the object types based on the metal content, even if there are no longer any luminescent substances.

The reference object type properties can also be used to autonomously check the reliability of object identification.

To check whether the reference object type property applied in the learning phase has an influence on the object properties detected for object recognition after all, a comparison of the identification of objects with reference object type property compared to the identification of objects without reference object type property. Identical results indicate an independence of the detected object properties from the reference object type property. A mixture of objects with and without reference object type property can also be tested here. If all objects are identified in the same way, there is no influence of the reference object type property on the identification result.

The detection of object properties can be used to determine the variance of object properties. The obtained variance of the measurement results can be used to adjust the detection modules.

By connecting and disconnecting different detection modules, the influence of different object properties on the identification result can be tested.

EXAMPLES

Example 1

Figure 2:
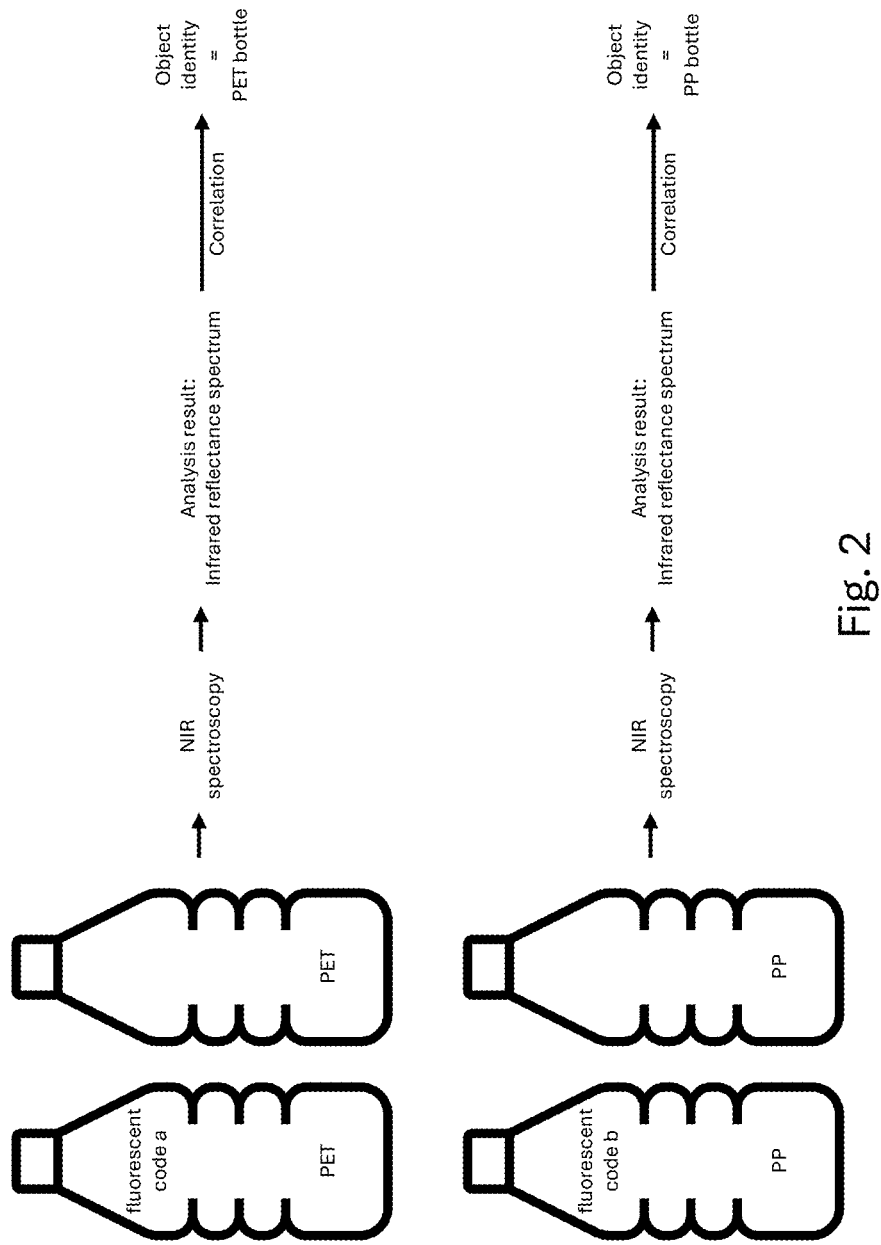

FIGS. 1 and 2 illustrate Example 1. Two types of plastic bottles A and B are to be identified by their bottle shape. The bottle shape is detected by a detection module with camera system. The bottles can be present in the detection module with random orientation, which makes automatic image recognition difficult.

The identification of the bottles is performed by means of AI technology. For autonomous training of the system by the object property "bottle shape" the bottles are marked with two different fluorescence codes a and b. The fluorescence codes a and b act as a reference object type property. The fluorescence codes a and b are stored in a database together with the associated object identities A and B.

For the learning phase, a plurality of plastic bottles A and B are analyzed autonomously by the system. The learning phase includes the analysis of the object property "bottle shape" by capturing images of the bottles, the presence check of the reference object type properties code a and code b, the assignment of the object identity bottle A to bottles with code a, the assignment of the object identity bottle B to bottles with code b and the adaptation of the algorithm which processes the images to detect patterns and regularities in the images and establish a correlation between the captured images and the object identity.

Once the learning phase is complete, the system can calculate the identity of the plastic bottles based on the captured images. The fluorescent codes used in the learning phase no longer need to be present on the bottles for this purpose.

When a sorting unit is integrated, the sorting unit can sort bottles A and B into different containers.

Example 2

Two cosmetic bottles A and B have different label designs. The bottles are to be identified by their optical design. The design is detected by a detection module with a camera system.

The identification of the bottles is performed by means of AI technology. For autonomous training of the system by the object property "optical design", the bottles are marked with two different fluorescence codes a and b. The fluorescence codes a and b act as a reference object type property. The fluorescence codes a and b are stored in a database together with the associated object identities A and B.

For the learning phase, a plurality of bottles A and B are analyzed autonomously by the system. The learning phase includes the analysis of the object property "optical design" by capturing images of the bottles, the presence check of the reference object type properties code a and code b, the assignment of the object identity bottle A to bottles with code a, the assignment of the object identity bottle B to bottles with code b and the adaptation of the algorithm which processes the images to detect patterns and regularities in the designs and establish a correlation between the captured designs and the object identity.

Once the learning phase is complete, the system can calculate the identity of the bottles based on the captured images. The fluorescence codes used in the learning phase no longer need to be present on the bottles for this purpose.

When a sorting unit is integrated, the sorting unit can sort bottles A and B into different containers.

Example 3

Two types of packaging A and B, on which labels A and B are located, are to be identified via water marks integrated into the labels. It should also be possible to distinguish packages A and B from package C, where package C does not contain a watermark in the label. The watermarks are detected by a detection module with a camera system. The packages and thus labels may be present with random orientation in the detection module. Furthermore, the labels may be dirty and mechanically deformed. These factors complicate the automatic detection of the watermarks.

The identification of the labels is performed by means of AI technology. For autonomous training of the system by the object property "water mark", the labels A and B are marked with two different fluorescence codes a and b.

The fluorescence codes a and b act as a reference object type property. The fluorescence codes a and b are stored in a database together with the associated object identities A and B. Label C does not receive a fluorescence code, so it does not contain a reference object type property.

For the learning phase, a large number of packages with labels A, B and C are analyzed autonomously by the system. The learning phase includes the analysis of the object property "watermark" by analyzing the labels, the presence check of the reference object type properties code a and code b, the assignment of the object identity label A to labels with code a, the assignment of the object identity label B to labels with code b and the adaptation of the algorithm which processes the watermarks to detect patterns and regularities in the watermarks and establish a correlation between the detected watermarks and the object identity. Also for labels C, the analysis of the object property "watermark" is performed by the detection module and the presence check of the reference object type property "fluorescent code" is performed. Since the reference object type property is not found, objects with label C receive the object identity "unknown". Therefore, for labels C, the algorithm learns the correlation between the object identity "unknown" and labels without watermark.

Example 4

Two types of packaging A and B are to be identified by labels with fluorescent codes applied to them. The fluorescence code is detected by a detection module with spectrometer.

The identification of the packages is performed by means of AI technology. For autonomous training of the system by the object property "fluorescence code", the different geometries of the packages A and B are used as reference object type property. The geometries a and b together with the corresponding object identities A and B are stored in a database.

For the learning phase, a plurality of packages A and B are analyzed autonomously by the system. The learning phase includes the analysis of the object property "fluorescence code" by spectrometer analysis, the presence check of the reference object type properties geometry a and geometry b, the assignment of the object identity packaging A to packaging with geometry a, the assignment of the object identity packaging B to packaging with geometry b and the adaptation of the algorithm which processes the fluorescence spectra to detect patterns and regularities in the spectra and establish a correlation between the acquired spectra and the object identity.

Once the learning phase is complete, the system can calculate the identity of the packages based on the detected fluorescence codes. The packages no longer have to have the packaging geometries used in the learning phase.

When a sorting unit is integrated, the sorting unit can sort packages A and B into different containers.

Example 5

Packaging contains a luminescent marker in the base material of the packaging. The packaging shows varying degrees of contamination. The influence of the contamination on the variance of the emission spectrum of the luminescence marker is to be analyzed.

A variety of packages is analyzed by the system. The analysis of the object property "emission spectrum" is performed by spectrometer analysis. As results the variances of emission intensity, emission maxima (wavelengths with maximum emission), and half-widths are obtained. The obtained results can now be used to adjust the spectrometer sensor technology.

Example 6

A wide variety of detection modules are used in a sorting system. For example, electrical conductivity, the IR reflectance spectrum, watermarks and fluorescence codes are detected. Two types of objects A and B are to be identified. The identification of the objects will be performed using AI technology. For autonomous training of the system, object A is marked with fluorescence codes a and object B is marked with fluorescence code b. The fluorescence codes a and b act as a reference property. The fluorescence codes a and b together with the corresponding object identities A and B are stored in a database.

The learning of the AI technology is to be carried out during operation. For the learning phase, objects A and B are mixed among other objects transported through the sorting system. The objects are analyzed autonomously by the system. The learning phase includes the analysis of the object properties "electrical conductivity", "IR reflectance spectrum" and "watermark", the presence check of the reference properties code a and code b, the assignment of the object identities A to objects with fluorescence code a and B to objects with fluorescence code b, the adaptation of the algorithms to detect patterns and regularities in the analyzed object properties and the establishment of a correlation between the detected properties and the object identity.

Once the learning phase is complete, the system can calculate the identity of the objects based on the detected object properties "electrical conductivity", "IR reflectance spectrum" and "watermark", and sort the objects A and B. The fluorescence codes used in the learning phase no longer need to be present on the objects for this purpose.

To test the object identification and sorting, the matching of the captured reference properties with the reference properties stored in the database and linked to object identities is deactivated. Subsequently, it is checked whether objects A and B are still correctly identified and sorted. Furthermore, objects A and B without fluorescence codes can be processed by the sorting system and their identification and sorting checked.

The foregoing description of the embodiments has been provided for purposes of description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for the identification and sorting of objects, including for the recycling of materials, the method comprising:
    linking at least one first object type to object identity information via a reference object type property uniquely identifying the first object type;
    performing at least one learning phase for teaching at least one AI algorithm, the learning phase comprising analyzing at least one object having the reference object type property for an object property, detecting the reference object type property in the at least one object, and assigning the first object type to at least one object based on the reference object type property;
    establishing a correlation between the object identity information and the at least one object property;
    analyzing at least one object for the at least one object property; and
    calculating an object identity of the object to the first object type using the at least one AI algorithm;
    wherein the at least one object property is different from the reference object type property.

2. The method of claim 1, wherein the reference object type property is a fluorescent code.

3. The method of claim 1, wherein the reference object type property comprises at least one of the following of the at least one analyzed object: XRF (X-ray fluorescence analysis) codes; magnetic codes; particle codes; electronic data; watermarks; bar codes; QR codes; symbols; part numbers; design elements; native object properties color; shape; size; and surface structure.

4. The method of claim 1, further comprising transmitting single object identities computed by at least two different AI algorithms to a voting algorithm for computing a combined object identity.

5. The method of claim 1, further comprising sorting the objects according to the calculated object identity or combined object identity.

6. The method of claim 1, wherein no further learning phase is performed after completion of the learning phase.

7. The method of claim 1, wherein the calculation of the object identity is performed by analyzing a reference object type property after completion of the learning phase.

8. The method of claim 1, wherein at least one reference object with at least one reference object type property is provided for the learning phase.

* * * * *